US008200659B2

(12) United States Patent
Zibitsker (10) Patent No.: US 8,200,659 B2
(45) Date of Patent: Jun. 12, 2012

(54) METHOD OF INCORPORATING DBMS WIZARDS WITH ANALYTICAL MODELS FOR DBMS SERVERS PERFORMANCE OPTIMIZATION

(75) Inventor: Boris Zibitsker, Wilmette, IL (US)

(73) Assignee: BEZ Systems, Inc., Wilmette, IL (US)

( * ) Notice: Subject to any disclaimer, the term of this patent is extended or adjusted under 35 U.S.C. 154(b) by 0 days.

(21) Appl. No.: 11/544,090

(22) Filed: Oct. 6, 2006

(65) Prior Publication Data
US 2007/0083500 A1   Apr. 12, 2007

Related U.S. Application Data

(60) Provisional application No. 60/724,447, filed on Oct. 7, 2005.

(51) Int. Cl.
*G06F 17/30* (2006.01)
(52) U.S. Cl. ...................................................... 707/719
(58) Field of Classification Search ............... 707/3, 719
See application file for complete search history.

(56) References Cited

U.S. PATENT DOCUMENTS

| | | | | |
|---|---|---|---|---|
| 5,852,818 | A * | 12/1998 | Guay et al. ........................ 707/1 |
| 5,899,986 | A * | 5/1999 | Ziauddin .............................. 1/1 |
| 6,529,901 | B1 * | 3/2003 | Chaudhuri et al. .................. 1/1 |
| 6,678,676 | B2 * | 1/2004 | Brickell et al. ....................... 1/1 |
| 7,941,332 | B2 * | 5/2011 | Liu et al. ...................... 705/7.11 |
| 2001/0034732 | A1 * | 10/2001 | Vorholt et al. .................. 707/10 |
| 2003/0036886 | A1 * | 2/2003 | Stone ............................. 702/188 |
| 2004/0002954 | A1 * | 1/2004 | Chaudhuri et al. ............... 707/2 |
| 2004/0003004 | A1 * | 1/2004 | Chaudhuri et al. ........... 707/200 |
| 2004/0010488 | A1 * | 1/2004 | Chaudhuri et al. ............... 707/3 |
| 2004/0181370 | A1 * | 9/2004 | Froehlich et al. ............. 702/187 |
| 2005/0010558 | A1 * | 1/2005 | Dettinger et al. ................ 707/3 |

OTHER PUBLICATIONS

John Marsh, The Continuous Improvement Toolkit, 1998, B T Batsford Ltd., pp. 95-97.*

* cited by examiner

*Primary Examiner* — James Trujillo
*Assistant Examiner* — William Spieler
(74) *Attorney, Agent, or Firm* — Bingham McCutchen LLP (57) ABSTRACT

Disclosed is an improved method and system for implementing DBMS server performance optimization. According to some approaches, the method and system incorporates DBMS wizards recommendations with analytical queuing network models for purpose of evaluating different alternatives and selecting the optimum performance management solution with a set of expectations, enhancing autonomic computing by generating periodic control measures which include recommendation to add or remove indexes and materialized views, change the level of concurrency, workloads priorities, improving the balance of the resource utilization, which provides a framework for a continuous process of the workload management by means of measuring the difference between the actual results and expected, understanding the cause of the difference, finding a new corrective solution and setting new expectations.

21 Claims, 7 Drawing Sheets

DBA Wizards Recommend Tuning Measures

METHOD OF INCORPORATING DBMS WIZARDS WITH ANALYTICAL MODELS FOR DBMS SERVERS PERFORMANCE OPTIMIZATION

CROSS-REFERENCE TO RELATED APPLICATIONS

The present application claims the benefit of U.S. Provisional 60/724,447 filed Oct. 7, 2005, which is hereby incorporated by reference in its entirety.

BACKGROUND OF THE INVENTION

DBMS vendors incorporate complex parallel processing architectures to manage dynamic and constantly changing workloads, growing volume of data, increasing number of users, and implementation of the new applications. Leading DBMS products that support parallelism include Oracle 10g with GRID architecture, IBM's DB2 UDB ESE and NCR's Teradata with Massively Parallel Processing (MPP) architecture. Performance management of the concurrent Data Loading, Business Intelligence (BI) Decision Support (DSS) and Online Transaction Processing (OLTP) workloads in a parallel processing environment is difficult and brings many challenges.

In a balanced parallel processing environment, the queries on many nodes are processed in parallel much faster. Change in a pattern of data access can significantly increase frequency of accessing specific data through one of the nodes and affect the balance of resource utilization. Data skewness, index and materialized views strategy, physical and virtual configuration, and selection of the OS and DBMS parameters can also affect the balance in usage of resources and performance of the applications in parallel processing environments.

In an unbalanced environment, the response time of requests depends on the contention for the over-utilized devices. Queuing time for resources on the over-utilized node can slow down the response time for other queries.

Wrong performance management and database tuning, priority allocation and concurrency control decisions can negatively affect the balance of utilization and level of service, customer satisfaction and business competitiveness. A DBA may spend significant amounts of time finding and fixing the problems. The time to identify and fix the problem could take days or even weeks. During this period the response time could be slow and reduced system throughput can negatively affect the business.

To improve DBA productivity DBMS vendors often offer wizards and self healing solutions. IBM refers to such solutions as "autonomic computing", Oracle calls it "self-healing" and NCR refers to this as "Teradata Active Systems Management" (TASM). A DBA typically should provide a set of SQL as input to the Wizard. Wizards recommend creation of new indexes and materialized views and estimate savings in CPU time and number of I/O operations only for the set of analyzed SQL. These recommendations have several limitations. If the DBA sends all SQL processed by DBMS to a wizard, it could take a very long time to perform an analysis. If DBA sends only SQL captured during short measurement interval, results could be inaccurate.

Recommendations based on analysis of the critical SQL collected during short period of time do not guarantee that they address the continuous and most serious problems.

There is a risk that recommendation is just a reaction based on occasional event.

Another risk is that the implementation of recommendations can improve performance for the selected set of SQL, but potentially can negatively affect other SQL and workloads.

DBMS wizard provide recommendations without setting the expectations about the expected outcome of their implementation on response time and throughput for each of the workloads. As a result, after implementation of the wizard's recommendations a DBA may not know if the goal is achieved or not. The DBA cannot compare multiple options and find the most effective solution, thus satisfying Service Level Objectives (SLOs) for different workloads.

SUMMARY OF THE INVENTION

According to some embodiments, disclosed is an iterative method and system for implementing DBMS server performance optimization, incorporating DBMS wizards recommendations with analytical queuing network models for purpose of evaluating different alternatives and selecting the optimum performance management solution with a set of expectations, enhancing autonomic computing by generating periodic control measures which include recommendation to add or remove indexes and materialized views, change the level of concurrency, workloads priorities, improving the balance of the resource utilization, which provides a framework for a continuous process of the workload management by means of measuring the difference between the actual results and expected, understanding the cause of the difference, finding a new corrective solution and setting new expectations.

One objective of an embodiment of the invention is to incorporate DBMS wizards with analytical models enabling evaluation of the alternatives and implement the optimization algorithm enabling continuous proactive performance management and control based on comparison of the actual results with expected and generating proactive corrective actions. This process includes continuous data collection, workload characterization, performance analysis and identification of the significant changes in response time and throughput, changes in pattern of usage of resources and changes in pattern of usage of data. Identification of the significant changes based on applying statistical process control narrows down the scope of analysis and identifies critical SQL which are sent to the DBMS wizards. Output from DBMS wizards is used as input by analytical models to predict the impact of each of the recommendations on performance of each of the business workload.

Modeling results and Service Level Objectives (SLOs) of each workload are used by the optimization module to compare different options, generate recommendations and set up expectations. After implementation of the recommendations, actual results are compared with expected and root-cause analysis and modeling results again are used to generate corrective actions.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
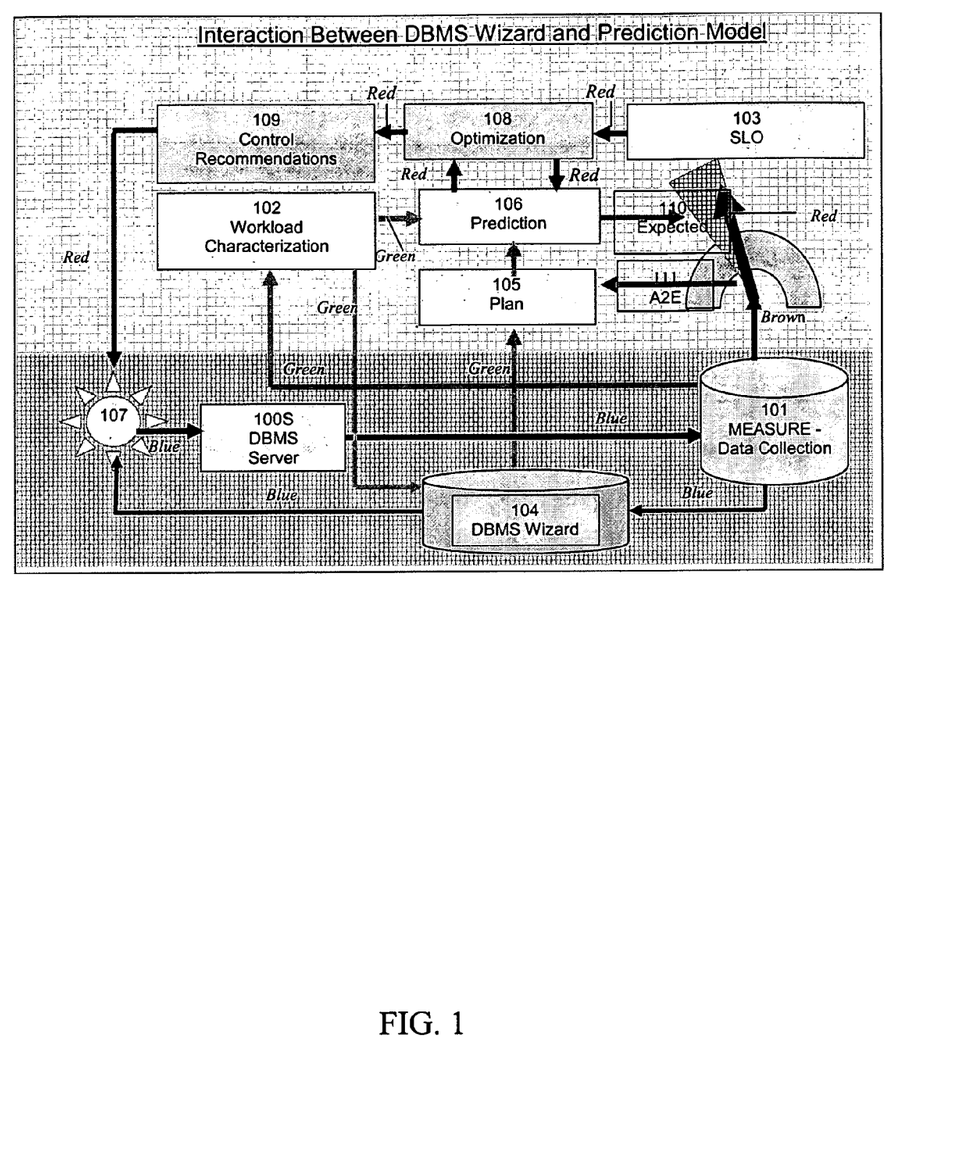
FIG. 1 shows an interaction between DBMS Wizard and prediction model according to some embodiments of the invention.

The interaction between components of an embodiment of the invention and standard systems management functions is graphically shown on FIG. 1. The lines marked as "Blue" lines on FIG. 1 represent a typical framework of continuous data collection by a DBMS and periodic usage of DBMS Wizards 104 by a DBA to identify tuning opportunities and to tune the DBMS. Examples of DBMS Wizards 104 include Oracle, DB2 UDB and Teradata Wizards. The Wizards 104 analyze SQL requests selected by the DBA and generate a list of recommendations with estimated benefits in reducing CPU time and number of I/O operations.

In the present embodiment, IBM, Oracle and Teradata Wizard's recommendations do not include expectations how their implementation will affect the response time and throughput for individual workloads. The recommendations can potentially improve performance for set of SQL of one of the workloads, but can negatively affect another workloads performance. Without expectations, a DBA cannot verify if the implementation of the Wizard's recommendations achieved the goal or not. If results are not satisfactory it takes time to correct the problem. In a meantime, slow response time and reduced throughput can cause lost business and reduction in number of the business transactions processed by the server.

SLOs 103, evaluation plan 105 and modeling results of the Prediction Engine 106 are used iteratively by Optimization Engine 108 to evaluate different options and develop Control Recommendations 109 with the most effective measures. Performance prediction results of the Prediction engine 106 set up the expectations 110. The difference between the Actual measurement results 101 and Expected 110, described in evaluation plan 105, Prediction engine 106 and Optimization engines 108 generate new corrective measures 109, which are implemented automatically or after approval of DBA 107.

Incorporation of the DBMS Wizard 104 and the inventive embodiment(s), e.g., a predictive performance management software, provides a framework for continuous proactive performance management. As shown on FIG. 1 the lines marked as "Blue" represent activities controlled by the DBA 107 during process of collecting data, usage of DBMS wizards 104 and implementing Wizard's recommendations. The lines marked as "Green" represent interactions with invention including extraction of the measurement data for workload characterization, identification of the critical SQL and send them as input to DBMS Wizard 104 to get recommendations, predict the impact of the recommendations. The lines marked as "Red" represent activity of the optimization engine, which use the SLO to identify the most effective measures and generate and advice. The lines marked as "Brown" show that actual results are compared with expected results, and the comparison result (e.g., the difference between the two results) is used to generate a plan with an objective to invoke a model and find optimum corrective measure. Each of the elements from FIG. 1 is described in more detail below.

Measure (101)

Measurement data 101 collected on DBMS servers 100S are used for Workload Characterization 102. Results of the Workload Characterization 102 are used to identify critical SQL affecting critical workloads performance. Critical SQL are sent as input to the DBMS Wizard 104. The recommendations of the Wizard 104 are used to create a Plan of evaluation 105 for Prediction Engine 106. Prediction Engine 106 predicts the impact of Wizard 104's recommendations on response time and throughput of all workloads.

The objective of the Measure (Data Collection) element 101 from FIG. 1 is to collect data characterizing the utilization of resources, frequency of accessing data and other characteristics, including response time of SQL. The functions of the Data Collection (101) element are shown in more detail in FIG. 2.

Figure 2:
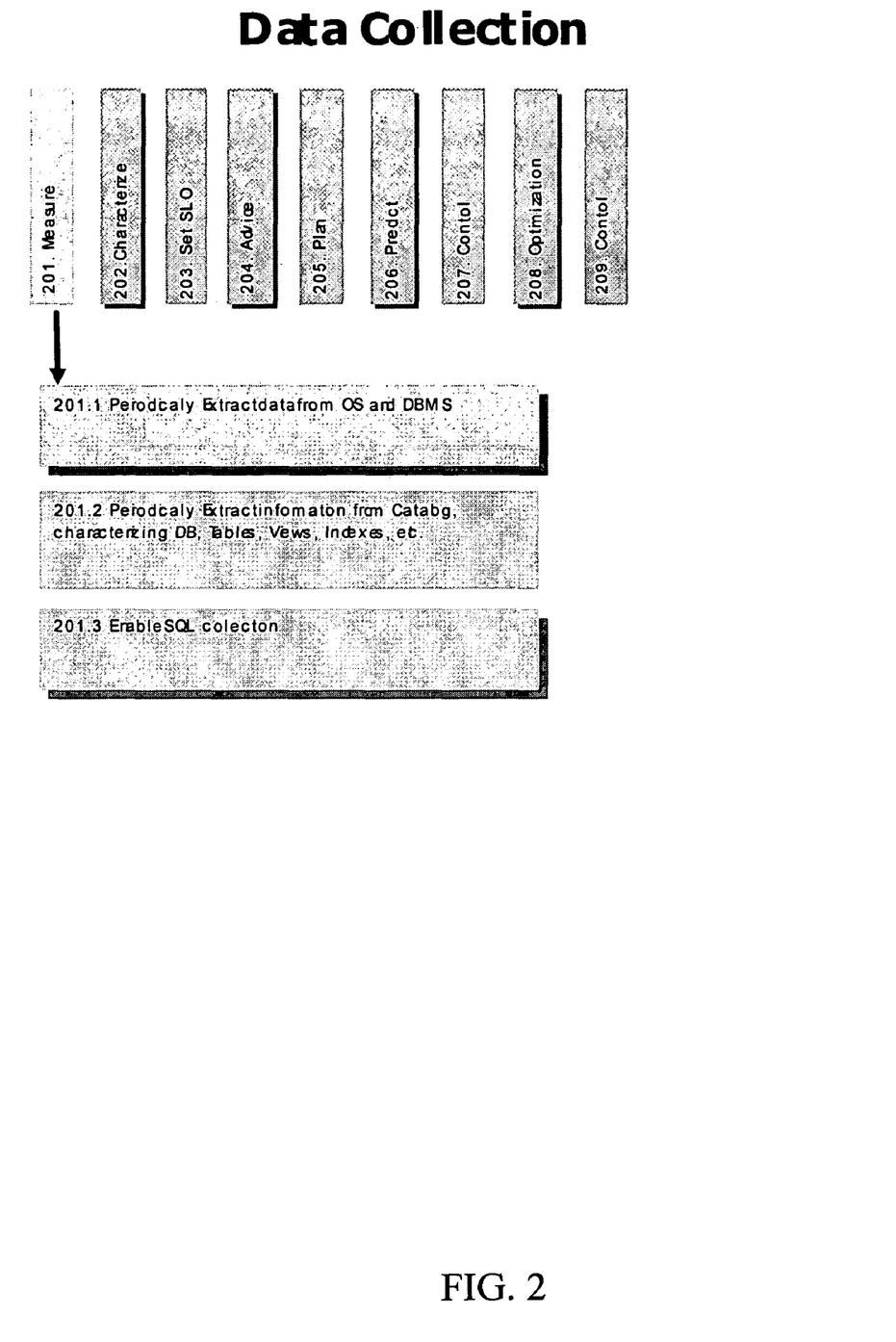
FIG. 2 shows a data collection process periodically extracting OS and DBMS measurement data according to some embodiments of the invention.

At 201.1, data is periodically extracted from the OS and DBMS. The measurement data from 201.1 from the OS level is used to characterize overall server CPU utilization and I/O rate. The DBMS data characterize performance characteristics of SQL and sessions statistics.

Pursuant to 201.2, information is periodically extracted from catalog. The information from catalog provides information about tables, their sizes, views, columns, indexes. This action of extracting information from catalog is used to characterize databases, tables and views used by SQL. The data collection process also extracts data from a volume manager to find location of the database objects on physical disks.

At 201.3, SQL collection is enabled to extract SQL. Different DBMS products have different methods for extracting SQL. For example, the Oracle DBMS product allows one to extract data from SQLArea. The DB2 UDB ESE products allows one to capture SQL from SQL Dynamic Cache. The Teradata product allows one to extract SQL from Data Base Query Log.

Workload Characterization (102)

The objective of Workload Characterization 102 element of FIG. 1 is to aggregate activity within DBMS server into several workloads representative of different business processes or line of business and build performance, resource utilization and data usage profile for each of the workloads. Workload characterization results are used for performance evaluation and also as input to performance prediction engine.

DBAs and analysts can use commercial performance management and performance prediction tools from IBM's Performance Expert, BMC Perform Predict, SAS Institute and others during Workload Characterization to identify major types of workload, create workload aggregation rules to aggregate measurement data and build performance, resource and data usage profiles for each workload. Results of the workload characterization are used by DBAs and performance analysts to identify critical workloads, and SQL and provide them as input by the wizard.

Workload Characterization results provide a view on service provided for each of the line of business. Performance analysis results using business workload prospective allow to establish realistic SLO, SLA and incorporate Service Level Management based on different service demand and requirements for each line of business.

Measurement data (101) provide an input for workload characterization. Performance, Resource utilization, Usage of data profiles provide an output of workload characterization.

Figure 3:
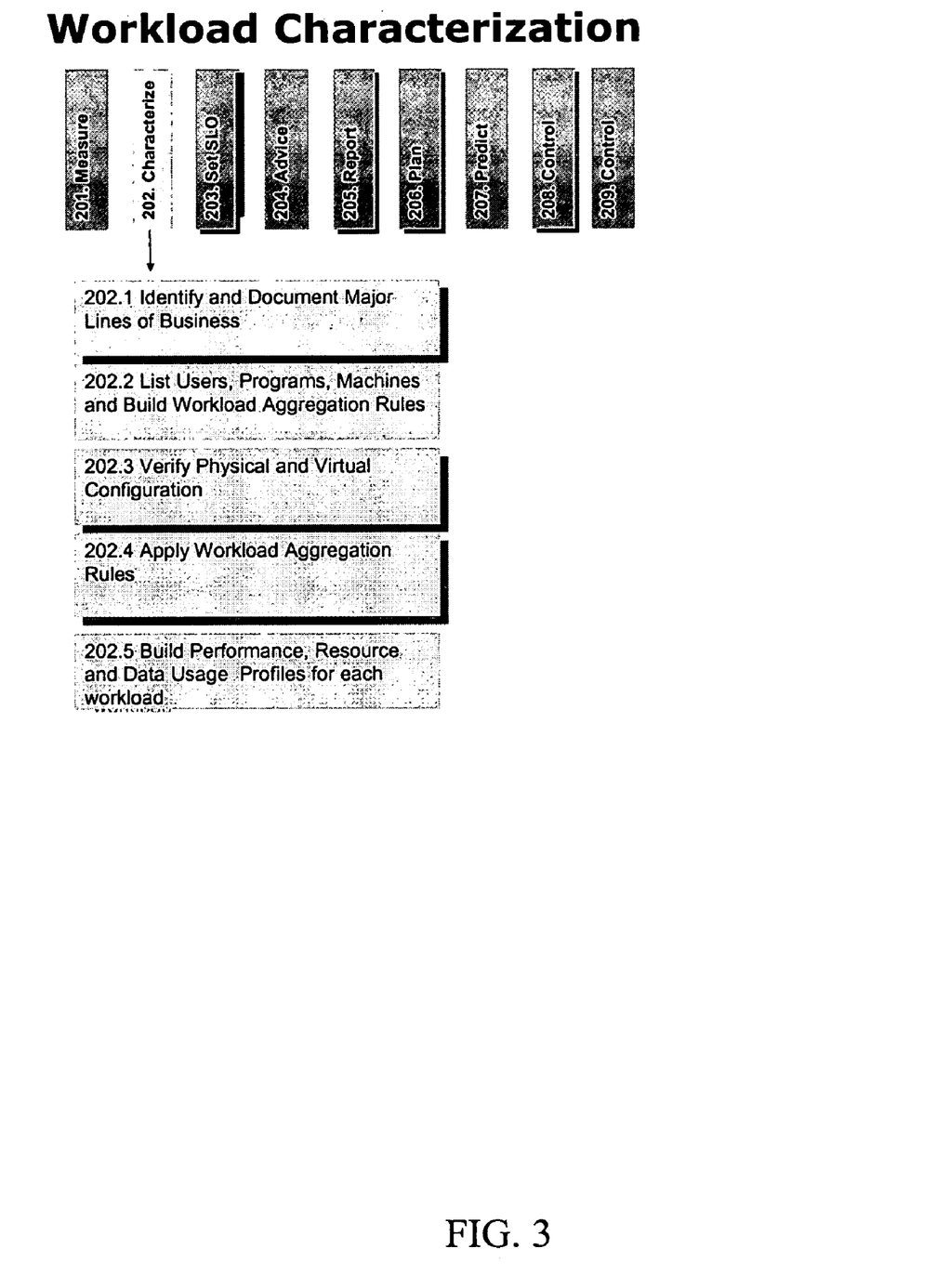
FIG. 3 shows workload characterization functions according to some embodiments of the invention.

The functions of the Workload Characterization (102) element are shown in more detail in FIG. 3.

At 202.1 major lines of business are identified and documented. Each line of business should represent important part of business. All performance evaluation and performance prediction results will refer to each workload performance.

At 202.2 workload aggregation rules are built. Workload aggregation rules allow aggregatation of SQL activity by User, Program, Machine or Module name into specific workloads. These rules will be automatically applied, e.g., every hour during the workload characterization process. During performance evaluation, the analyst will be able to use root cause analysis to identify critical workload and critical element(s) of the workload, e.g., user information, further critical SQL, and other information which relating to elements which cause or potentially will cause the performance degradation.

At 202.3 the physical and virtual configuration of the DBMS server is verified. The workload resource utilization profile is built based on collected measurement data on specific physical and virtual configuration(s).

At 202.4 the workloads' aggregation rules are applied against measurement data. Each captured SQL request and corresponding statistics is assigned to a specific workload.

At 202.5 the workloads' performance, resource utilization and data usage profiles are built and saved. The workload characterization process is performed periodically, for example, every hour. Analysis of the performance trend in usage of resources and data provides a valuable information for performance tuning. The workloads' profiles are also used as input for prediction engine to evaluate the impact of the proposed changes.

Establish Service Level Objectives (SLO) (103)

The objective of the SLO 103 element from FIG. 1. is to set realistic SLO. DBAs and performance analysts present to management and business users performance management reports with historical trend and performance prediction results showing the relationship between Service Level Objectives (SLOs) and corresponding hardware configuration requirements. Analysis of relationship between SLO and the Total Cost of Ownership (TCO) allow setting realistic SLO. The functions of the SLO (103) element are shown in more details in FIG. 4a.

Figure 4A:
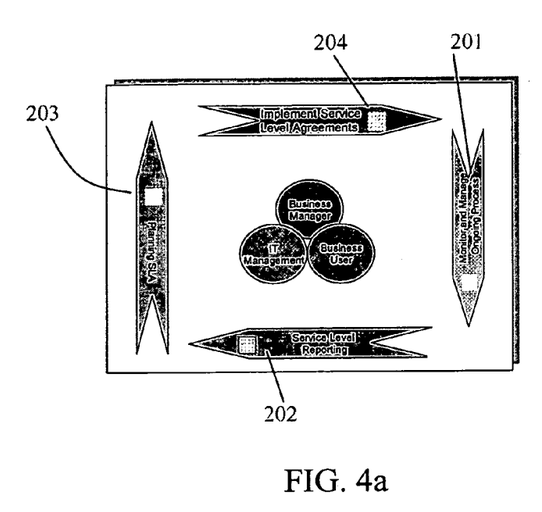
FIGS. 4a and 4b illustrate how performance measurement data and performance prediction results are used to set realistic SLO according to some embodiments of the invention.

At 201 OS and DBMS performance measurement data are collected using standard OS and DBMS methods.

At 202 results of performance measurements and monitoring are used for service level reporting. Standard performance management reports reflecting trend in response time, throughput and usage of resources be different workloads are generated and analyzed to understand the past and present level of service provided to the individual line on business.

At 203 service level reporting results are used for planning SLA. Information about expected growth in number of users, increase volume of data and plan to implement new applications is presented by IT users. IT representative document the level of service they are planning to provide, based on expected workload and planned hardware upgrades.

Iterative modeling and evaluation of the minimum configuration required to support specific SLA is used to find a relationship between specific SLO and hardware configuration requirements. Hardware, Software and People Cost are major component of the Total Cost of Ownership (TCO).

Figure 4B:
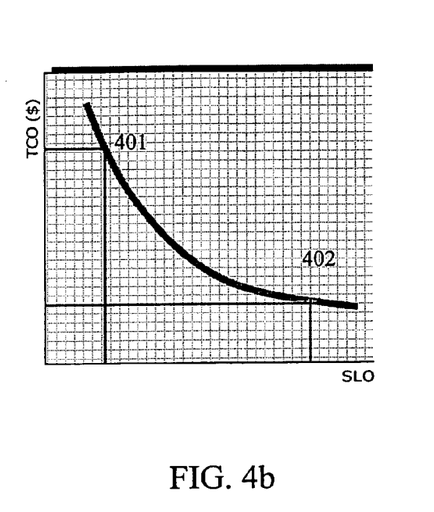

FIG. 4b illustrates a model that shows a relationship between TCO and SLO for an example implementation. 401 represents a point at which TCO is estimated for a very aggressive SLO. 402 represents a point at which TCO is estimated for a non-aggressive SLO.

Returning back to FIG. 4a, at 204, a comparison is performed of the desired SLO and predicted required hardware configuration and corresponding TCO to find a compromise between performance requirements and expected hardware requirements and to justify and implement realistic SLA.

Get DBMS Wizard Recommendations (104)

Figure 5:
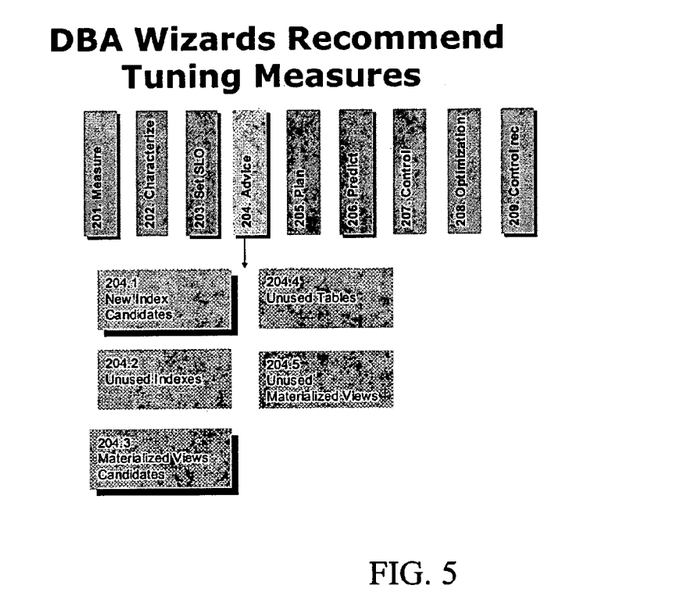
FIG. 5 shows how Index wizards are used to analyze critical SQL requests to generate tuning recommendations according to some embodiments of the invention.

The objective of the Wizard 104 element from FIG. 1 is to get and save DBMS. Wizards tuning recommendation. IBM's Design Adviser, NCR Index Wizard, Oracle's Wizard use critical SQL as input and generate the following recommendations:

New Index Candidates
Unused Indexes
Materialized Views Candidates
Summarization Candidates
Unused Summary Tables
Denormalization candidates
Unused Tables The functions of the Wizard (104) element are shown in more detail in FIG. 5.

At 204.1 the Wizards 104 generate list of New Index candidates. The Wizard 104 also estimates the savings in CPU service time and reduction in number of I/O operations as a result of the implementing new indexes. This information is used as input to Prediction Engine 106 to estimate the impact of proposed measures on each of workloads' response time and throughput.

At 204.2 a list of unused indexes is generated, e.g., by an Adviser. Dropping unused indexes can release significant amount of disk space and reduce cost of index maintenance At 204.3 the Wizard 104 generates a list of Materialized Views candidates. The Wizard 104 also estimates the savings in CPU service time and reduction in number of I/O operations as a result of the implementing new Materialized Views. This information is used as input to Prediction Engine 106 to estimate the impact of proposed measures on each of workloads' response time and throughput.

At 204.4 the Adviser builds a list of unused tables or dormant data. Dropping unused tables can release significant amount of disk space and reduce TCO.

At 204.5 the Adviser generates a list of unused Materialized Views. Dropping unused Materialized Views can release significant amount of disk space and reduce cost of Materialized Views maintenance.

Plan and Evaluation Scenario (105)

The objective of Plan 105 element from FIG. 1 is to describe Wizard's recommendations as input for Prediction Engine 106. DBA Wizards 104 provide a list of performance tuning recommendations with estimated reduction of CPU time and number of I/O operations as a result of implementation each of the recommendations for analyzed group of SQL.

The Prediction Engine 106 predicts the impact of the Wizard's recommendation implementation on performance of all workloads.

Evaluation Plans are used by modeling products, e.g., TeamQuest, BMC Perform Predict, HyPerformix and others, to describe "what if" questions which should be addressed by the model.

Each workload includes many SQL which will not be affected after implementation of the specific recommendation. The average CPU time, average number of I/O operations per workload, should be recalculated based on difference in CPU time consumed by all SQLs of the workload and savings in CPU time and number of I/O operations saved as a result of implementing the recommendation.

Performance Prediction Engine (106)

The objective of the Prediction Engine 106 element from FIG. 1 is to predict performance and compare proposed measures, including different wizard's DBA tuning recommendations, on response time and throughput for different workloads.

The Performance Prediction Engine 106 is based on analytical queueing network models or simulation models that predict the impact of the proposed changes on performance of each workload. For example, BMC Perform Predict and TeamQuest use analytic models and HiPerformix uses simulation modeling technique. Models are used to predict the impact of the different options and find the optimum solution by predicting the impact of the DBMS wizard recommendations on performance, response time, throughput and usage of resources for each of the workloads and recommend the most effective changes. Performance prediction allow one to compare the impact of the priority change on the performance of each workload and to select the optimum priority setting to satisfy SLO and SLA for different workloads. Modeling predicts the impact of the changing the level of parallelism on the performance of each workload and recommends what should be changed.

Performance prediction show the expected impact of changing the level of concurrency in number of users and concurrent jobs on performance of each workload. Modeling results can be used to predict the impact of the memory redistribution and to recommend the optimum solution.

Some advantages of performance prediction is in organizing proactive measures, ability to evaluate the impact of proposed hardware upgrade, performance tuning, workload and data growth and selection of the best solution based on expected results. It minimizes the risk of surprises, reduces uncertainty, provides a framework for continuous, and provides proactive closed loop management.

Figure 6:
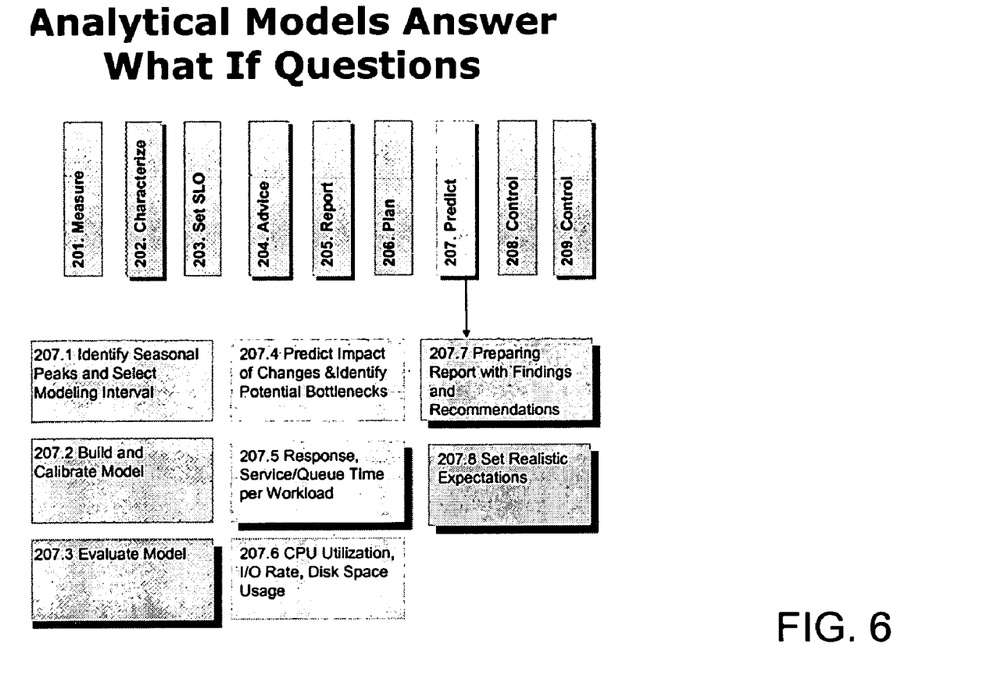
FIG. 6 illustrates how performance prediction results are used to set expectations, compare actual results with expected and recommend corrective actions according to some embodiments of the invention.

The functions of the Prediction (106) element are shown in more detail in FIG. 6.

At 207.1 seasonal peaks are analyzed and a representative modeling interval is selected to build a baseline model. Typically, planning is done for the peak activity during day time and night time.

At 207.2 the model is built and calibrated. Commercial modeling tools use results of the workload characterization, workload forecasting and performance evaluation scenarios to predict the impact of the workload growth and justify hardware upgrade and database tuning measures needed to support business needs in a most effective manner.

At 207.3 an evaluation scenario is used and the model is evaluated. The evaluation scenario of commercial modeling tools includes assumptions about expected workload growth and expected increase in volume of data processed by each workload.

At 207.4 different changes are evaluated and future potential performance bottlenecks are identified. Commercial modeling tools typically use queuing network models to predict the impact of the planned changes.

At 207.5 the impact of changes on response time, service/queue time for each workload is estimated. In some implementations, the most important criteria used to evaluate level of service are response time and throughput.

At 207.6 the CPU Utilization, I/O Rate, disk space usage by each workload is predicted. The resource utilization profile is used to detect significant changes in profile of application caused by change of functionality or increased complexity of SQL.

At 207.7 a report is prepared that includes, for example, performance prediction results, assumptions, findings and recommendations.

At 207.8 modeling results and assumptions about expected growth are used to establish realistic expectations. Actual measurement results are compared with expected, and if necessary, corrective actions are recommended. Prediction results minimize the risk of surprises, reduces uncertainty, provides a framework for continuous, pro-active closed loop management.

Implementation of the Recommendations (107)

The Implement (107) element from FIG. 1 implements recommendations how to change workloads priorities, create indexes, materialized views or software parameters to reduce the difference between actual results and expected 109. Recommendation can be approved by DBA or applied automatically.

Optimization (108)

The Optimization 108 element from FIG. 1 runs the prediction engine 106 iteratively to evaluate different wizard's recommendations and to identify a set of solution(s) having the biggest positive impact on major workloads.

Control Recommendations (109)

The Control 109 element from FIG. 1 keeps the list of most effective wizard's recommendations evaluated by the Prediction engine 106 and Optimization element 108 and is capable of improving the performance of the most critical workloads with set expectations 110.

Set Expectations (110)

The Expectation 110 element from FIG. 1 sets expectation based on modeling results for each workload. Expectations include, for example, expected arrival rate, response time, CPU service time, number of I/O operations, CPU per request, number of I/Os per request for each of the modeling periods.

Difference Between Actual Results and Expected (111)

The objective of A2E element 111 from FIG. 1 to find the difference between Actual results and Expected. If actual results are significantly different from the expected than the root cause analysis determines the reason of the difference, and identifies the new set of critical SQL which are sent to the DBMS wizard 106 for analysis to recommend corrective action 109.

Figure 7:
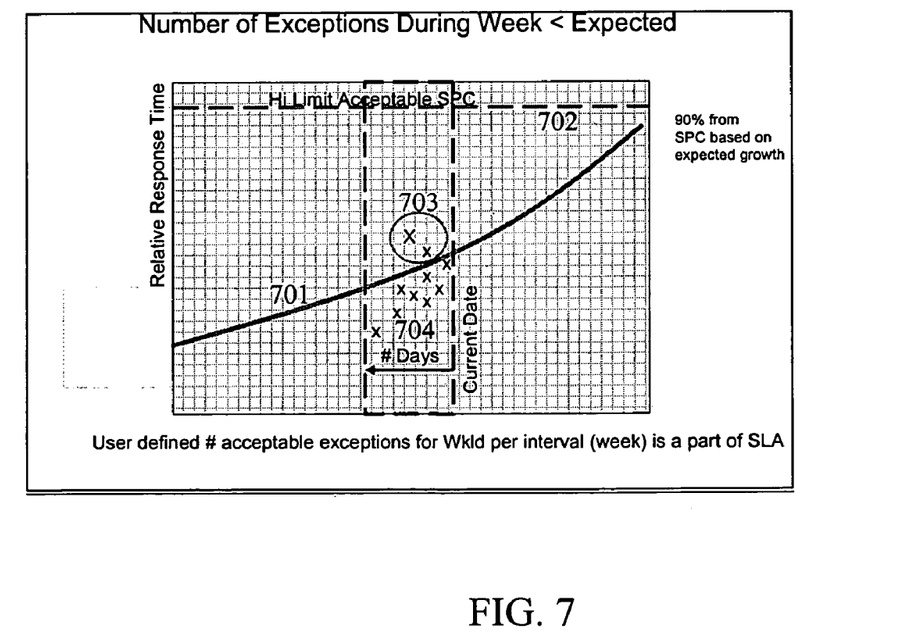
FIG. 7 shows how the difference between actual and expected results is used to identify and measure the number of exceptions according to some embodiments of the invention.

FIG. 7 illustrate comparison of the actual results with expected 111 in more details. This figure shows how to identify the continuous problem, e.g., based on number of exceptions during specific interval of time such as a one week interval.

The results of the performance prediction at 701 show the expected impact of the workload growth. High limit of the acceptable SPC performance (e.g., 90 percentile)—702 is not reached, however if the number of exceptions 703 per week (2) is greater than acceptable, it triggers the action—start of performance analysis to justify corrective actions.

Root cause analysis applied to identify SQL causing exceptions is based on the following logic. First, the process analyzes the response time components and finds the biggest component(s), e.g., the CPU service time or queuing time. The process then determines which component is larger, e.g., CPU, I/O and interprocess communication time. The process identifies elements that may cause the problem(s), e.g., critical SQL and DB objects, including tables, views, materialized views, summary tables. Them a new evaluation plan is created and performance prediction results are used to find the best way to fix a problem.

Figure 8:
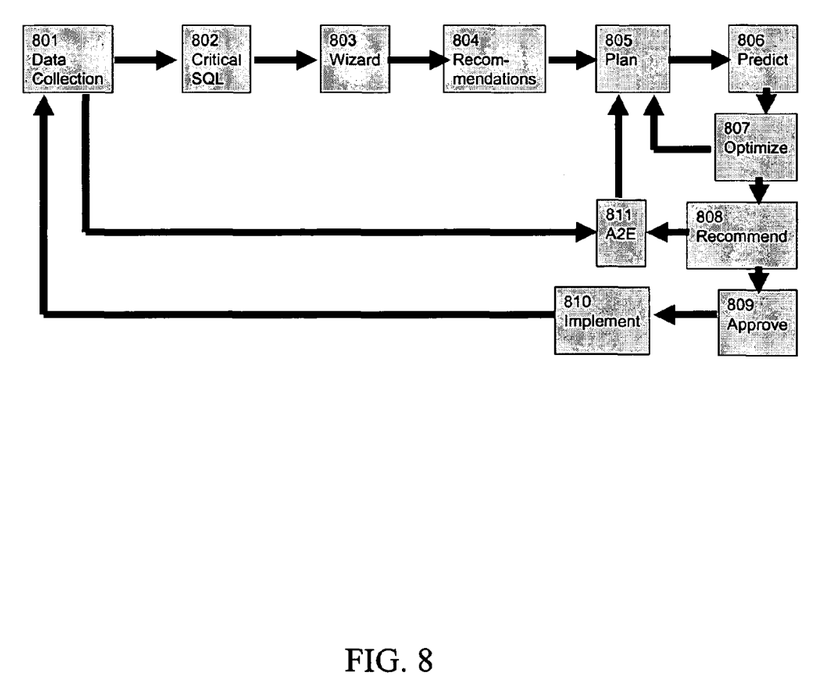
FIG. 8 shows a sequence of steps of a continuous process of proactive performance management based on using Wizard, Performance Prediction and Optimization Engine according to some embodiments of the invention.

Illustrative Example of Incorporating Oracle SOL Access Adviser with Analytical and Performance Optimization Engines In one illustrative example of the invention shown in FIG. 8, the Oracle SQL Access Advisor 803 (Wizard) is invoked daily. The Oracle SQL Access Advisor uses critical SQL 802, captured during data collection 801 and generates recommendations 804 based on analysis of SQL and SQL metrics such as CPU time, buffer gets, disk reads, number of rows processed, executions, elapsed time from SQL Cache. The recommendations from the Oracle SQL Access Adviser are saved daily in a repository.

Periodically, the data from the repository of wizard's recommendations is accessed, in which all daily recommendations are sorted by potential savings in CPU and I/O. An Evaluation Plan 805 is created with an objective to predict the impact of the proposed tuning measures on performance of all workloads (806). Some of recommendations can improve performance for one of the workloads, but potentially negatively affect the performance of other workloads.

The implementation uses a baseline model based on the peak hour activity to predict the impact of the Wizard's Index and Materialized View recommendations on response time and throughput for each of the workloads. The Optimization engine 807 invokes the Prediction Engine 806 iteratively to evaluate all Wizard's recommendations 804 and their impact on performance of each of the workloads. The Optimizer uses SLO and performance prediction results to select the recommendations 808 with the biggest positive impact on workloads' response time and systems throughput.

The final set of recommendations and corresponding performance prediction results are saved. They will be used as expectations. Recommendations to change priority or level of concurrency can be applied automatically. Creation of the new indexes or materialized views recommendations may require DBA approval 809 prior to the implementation 810.

After implementation of the wizard's recommendations, the actual performance measurement data will be compared with corresponding expectations (A2E) 811. If actual results are significantly worse than expected, a root cause analysis will be performed with objective to identify the cause of the difference and to identify critical SQL causing the difference between actual and expected results. If critical SQL causing the difference between actual and expected results can be identified, than they will be processed by Wizard again with objective to create a new set of corrective recommendations.

SYSTEM ARCHITECTURE OVERVIEW

Figure 9:
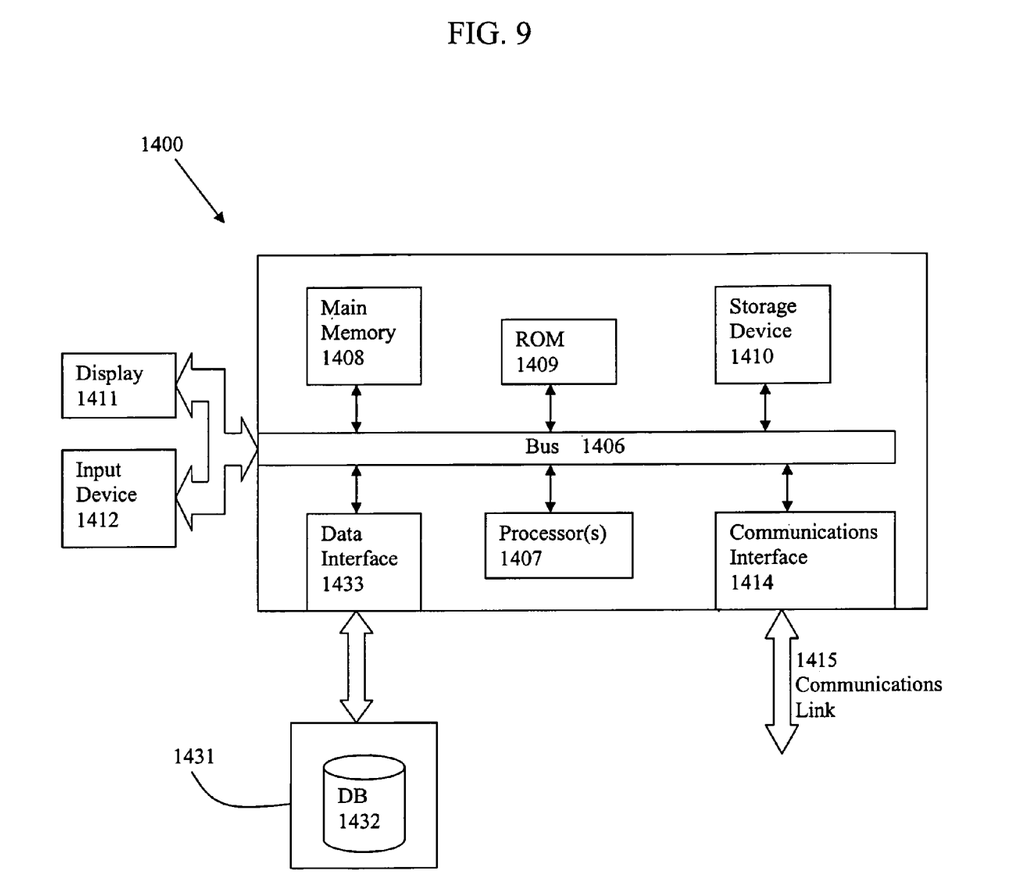
FIG. 9 illustrates an example computing architecture with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for improving database performance, the computer comprising a processor, the method comprising:
   gathering information corresponding to plural workloads for a database system;
   characterizing the workloads, wherein a data utilization profile is created for each of the workloads;
   building performance and resource utilization profiles;

identifying critical query statements in the workloads by applying statistical process controls to identify SQL currently causing performance degradation;

identifying SQL that may cause future decreases in database performance;

obtaining a recommendation from a DBMS wizard on at least one of the workloads; and predicting an impact of the recommendations on response time and throughput for the workloads for the database, wherein at least one of the workloads is not used in the DBMS wizard.

2. The method of claim 1 further comprising:

filtrating critical SQL using statistical process control.

3. The method of claim 2, in which the statistical process control comprises identification of significant change in pattern of at least one of: resources and data, response time, throughput, CPU or storage subsystem utilization.

4. The method of claim 2 further comprising:

feeding the DBMS Wizard with a set of critical SQL.

5. The method of claim 4 in which the set of critical SQL corresponds to critical workload performance.

6. The method of claim 1 further comprising:

modifying the workload characterization results to reflect the impact of the proposed wizard's recommendations.

7. The method of claim 6 in which the impact corresponds to at least one of:

workload CPU usage, workload I/O service time, or level of parallelism.

8. The method of claim 1 further comprising:

using an analytic queuing network model to predict the impact of the proposed wizards changes on performance of one or more workloads.

9. The method of claim 1 further comprising:

optimizing based upon iterative use of an analytic queuing network models to justify an effective solution.

10. The method of claim 1 further comprising:

setting a service level agreement and expectation based on performance prediction results and expected workload and database size growth.

11. The method of claim 1 further comprising:

performing proactive performance management based on comparing actual results with expected results.

12. The method of claim 11, in which management is based upon finding a difference between the actual results with expected results, applying root cause analysis and development of the proactive corrective actions.

13. The method of claim 1 further comprising:

sending critical requests to the DBMS Wizard based on applying statistical process control to identify significant changes in at least one of: response time, throughput, pattern of resources usage, or pattern of data usage.

14. The method of claim 13 in which root cause analysis is used to identify the critical SQL.

15. The method of claim 1 further comprising:

incorporating DBMS wizards recommendations as input for an analytical queuing network model.

16. The method of claim 15 further comprising:

modifying workload characterization parameters and predicting the impact of the proposed recommendations on performance of the workload.

17. The method of claim 1 further comprising:

optimizing based on iterative use of analytical models, taking into considerations workloads' SLO's, and comparing the impact of different wizards' recommendations.

18. The method of claim 1 further comprising:

organizing a proactive process of managing DBMS workloads performance.

19. The method of claim 18 in which the act of organizing a proactive process comprises:

enabling automatic implementation of recommendations, comparing actual results with expected to identify the cause of the difference and implementing new corrective actions based on modeling results comparing new alternatives justifying the optimum measures.

20. A computer implemented system for improving database performance, comprising:

means for causing a computer to gather information corresponding to plural workloads for a database system;

means for causing a computer to characterize the workloads, wherein a data utilization profile is created for the each of the workloads;

means for causing the computer to build performance and resource utilization profiles;

means for causing a computer to identify critical query statements in the workloads by applying statistical process controls to identify SQL currently causing performance degradation;

means for identifying SQL that may cause future decreases in database performance;

means for obtaining a recommendation from a DBMS wizard on at least one of the workloads;

means for predicting an impact of the recommendations on response time and throughput for the workloads for the database, wherein at least one of the workloads not used in the DBMS wizard.

21. A computer program product comprising computer usable medium storing executable code which implements a method that excludes signals for improving database performance, the method comprising:

gathering information corresponding to workloads for a database system;

characterizing the workloads, wherein a data utilization profile is created for each of the workloads;

building performance and resource utilization profiles;

identifying critical query statements in the workloads by applying statistical process controls to identify SQL currently causing performance degradation; and obtaining a recommendation from a DBMS wizard on at least one of the workloads; and predicting an impact of the recommendations on response time and throughput for the workload for the database, wherein at least one of the workloads is not used in the DBMS wizard.

* * * * *